May 16, 1967
U. HAUCK
3,319,741
HYDRAULIC VIBRATION DAMPER
Filed Jan. 19, 1966
2 Sheets-Sheet 1
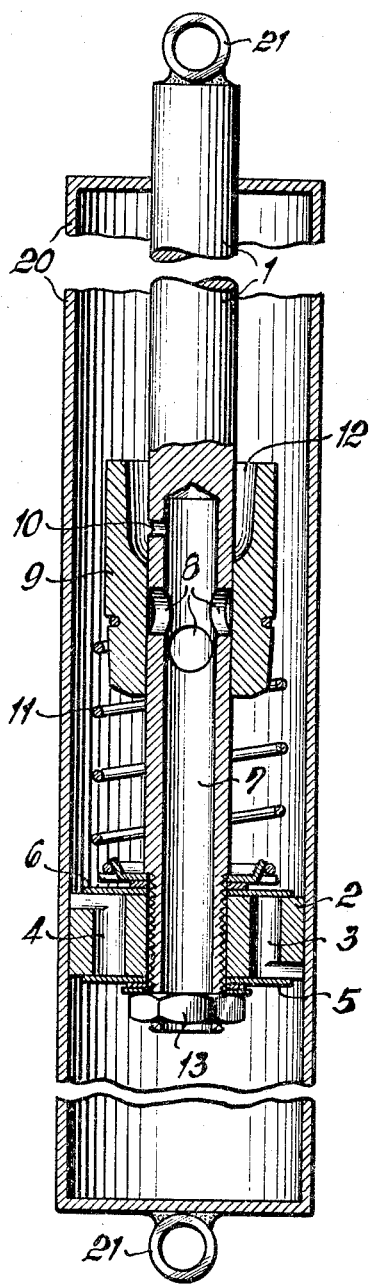
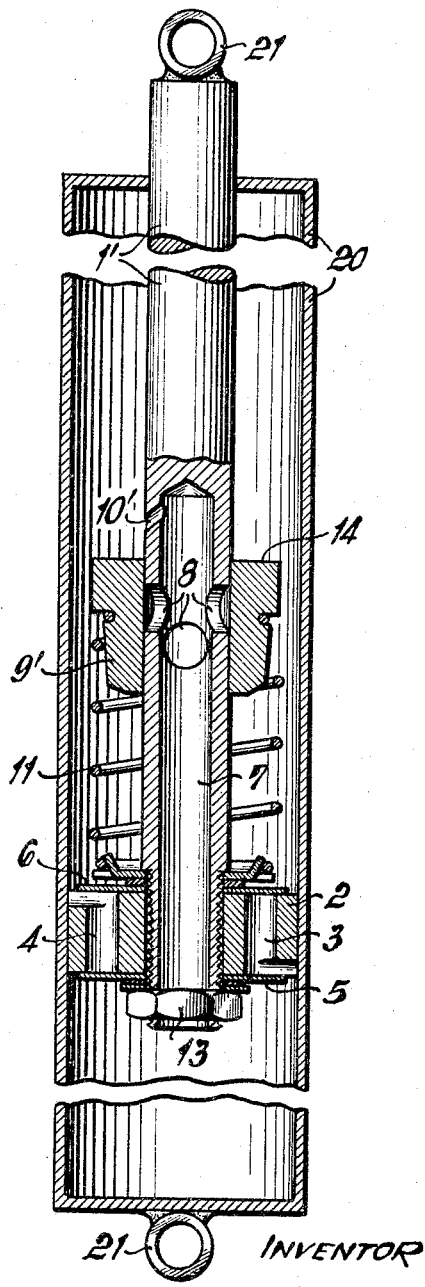
INVENTOR
URBAN HAUCK
By: Low and Berman
Agents United States Patent Office 3,319,741
Patented May 16, 1967

3,319,741
HYDRAULIC VIBRATION DAMPER
Urban Hauck, Michelau, Germany, assignor to Fichtel & Sachs A.G., Schweinfurt, Germany
Filed Jan. 19, 1966, Ser. No. 521,691
Claims priority, application Germany, Jan. 22, 1965, F 45,038
6 Claims. (Cl. 188—96)

This invention relates to hydraulic vibration dampers, and particularly to an improvement in a known vibration damper which is being employed for stabilizing the drum of a washing machine while the drum rotates at high speed for centrifugally extracting water from the material which is being laundered.

The known vibration damper with the improvement of which this invention is concerned has a liquid-tight cylinder in which a piston is axially slidable. The piston divides the cylinder cavity into two compartments and moves inward and outward of the compartments during its axial movement. A piston rod attached to the piston passes through one of the compartments and projects outward of the cylinder in sealing engagement with the axial end face of the latter. Fastenings on the cylinder and the projecting portion of the piston rod permit the device to be interposed between the frame and the tub of a washing machine, a drum being rotatably mounted in the tub.

The damping effect is produced by liquid which fills the cylinder and can flow between the compartments through one or more restricted axial passages in the piston. A bore in the piston assembly is open to the other cylinder compartment which extends at least partly into the piston rod and communicates with the compartment surrounding the piston rod through an aperture in the latter. This aperture, which by-passes the passage or passages in the piston and thereby reduces the damping effect, may be partly or entirely obstructed by a heavy-walled sealing sleeve coaxial with the piston rod and axially slidable on the same.

A spring connects the sleeve to the piston, and the mass of the sleeve and the characteristics of the spring are selected in such a manner that the sleeve is stationary in its aperture-obstructing position when the drum of the washing machine rotates at its critical speed, thereby affording maximum damping when it is needed most. At other drum speeds, the sleeve oscillates on the piston rod, and the aperture in the latter is mostly open and unobstructed.

While vibration dampers of the type described have been used quite successfully, their performance is not fully reliable. I have found that occasional inadequate damping at critical drum speeds is due to axial displacement of the sealing sleeve by the stream of liquid axially emitted from the passage or passages in the piston during movement of the piston outward of the cylinder compartment in which the sealing sleeve is arranged.

The object of the invention thus is the provision of means for balancing the axial force exerted by the aforementioned stream of liquid without materially interfering with the normal functioning of the sleeve.

With this object in view, I provide a jet or nozzle on the piston assembly, preferably the piston rod, which communicates with the bore in the piston rod and is oriented in such a manner that it directs a stream of liquid toward a radially extending face of the sleeve which faces axially away from the piston and the orifices of the afore-mentioned passages through the piston when the sleeve is in its operative position, and when the piston moves in such a manner as to force liquid into the bore of the piston rod and through the passages in the piston.

Other features and many of the attendant advantages of this invention will be readily appreciated from the following detailed description of preferred embodiments when considered with the appended drawing in which:

FIG. 1 shows an oscillation damper of the invention in axially sectional fragmentary view;

FIG. 2 is a similar view of a modified vibration damper; and

Figure 3:
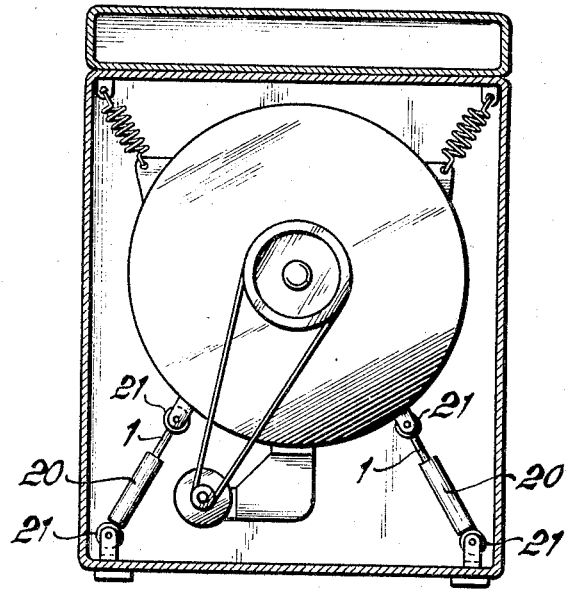
FIG. 3 shows a washing machine equipped with oscillation or vibration dampers of the invention in rear elevation and partly in section.

Referring now to the drawing in detail, and initially to FIG. 1, there is seen an elongated cylinder 20 from which a portion of a piston rod 1 projects in an axial direction. Fastenings 21 on the cylinder and piston rod permit the device to be interposed between two masses whose relative movement is to be damped.

The inner end of the piston rod 1 carries an annular piston 2 having restricted axial passages 3, 4. The piston 2 divides the cavity of the cylinder 20 into two compartments which increase and decrease in axial length as the piston 2 and the piston rod 1 move during normal operation of the device. The cylinder 20 is normally filled with liquid which flows through the passages 4, 5 during piston movement. Annular spring discs 5, 6 respectively seal the passages 4, 5 during downward and upward movement of the piston 20 as viewed in FIG. 1, as is conventional in this art.

The inner end portion of the piston rod 1 is hollow. Its axial bore 7 is downwardly open, and the bore extends in an upward axial direction well beyond the piston 2. The piston is secured on the reduced free end of the rod 1 by a nut 13 and washers 15 interposed between the piston 2 and a shoulder on the rod 1.

Four relatively wide radial apertures 8 in the hollow end portion of the piston rod 1 are arranged approximately on a common level, only three apertures 8 being visible in the view of FIG. 1. A heavy-walled sleeve 9 obstructs the apertures 8 in the illustrated operative position in which the sleeve is normally held by a helical spring 11 coaxially enveloping the piston rod 1. The ends of the spring 11 are attached to the sleeve 9 and the washers 15.

The axial bore of the sleeve 9 is radially enlarged at the top to form an upwardly open annular recess 12 whose outer wall is of approximately hyperbolic concave cross section in an axial plane, circular in a radial plane and is normally axially offset from the apertures 8. As is shown in the drawing, the lower portion of the outer wall bounding the recess 12 is inclined relative to the cylinder axis at an angle of approximately 45°, and this angle of inclination decreases toward the open top of the recess 12 almost to zero.

A radial bore 10 extending outward from the axial bore 7 of the piston rod 1 into the recess 12 in the illustrated position of the device constitutes a jet or nozzle which is directed toward a portion of the recess wall only slightly inclined relative to the cylinder axis, but axially closely adjacent the more steeply inclined wall portion.

The modified embodiment of the invention illustrated in FIG. 2 differs from that shown in FIG. 1 by a sleeve 9' whose entire top face 14 extends approximately in a radial plane, and by a jet or nozzle 10' communicating with the axial bore 7 of the piston rod 1' and directed obliquely downward and radially outward toward the top face 14 of the sleeve 9' when the sleeve is in the illustrated operative position.

FIG. 3 illustrates the manner in which the vibration dampers of the invention illustrated in FIGS. 1 and 2 are normally employed in a washing machine. A sheet metal casing or shell 16 is provided with rubber feet 17 and encloses a tub 18 which is suspended within the shell 16 on two heavy helical springs 19 and two vibration dampers of the invention. An electric motor 22 is mounted on the tub 18 by means of a bracket 23 and drives the shaft 24 of the washer drum, not itself visible in the drawing by means of two pulleys 25, 26 on the motor 22 and the drum shaft 24 respectively, and a belt 27 trained over the pulleys. The wiring of the motor 22 and other conventional elements of the illustrated washing machine not directly relevant to this invention have been omitted from the showing of FIG. 3 for the sake of clarity.

The afore-described device operates as follows:

During vibration or oscillation of the washer drum, the piston 2 reciprocates axially in the cylinder 20. A liquid admitted through a non-illustrated, normally plugged nipple normally fills the cylinder 20 and damps movement of the piston 2. As long as the frequency of piston oscillation is different from the frequency of the oscillating system constituted by the sleeve 9, 9' and the associated spring 11, the sleeve moves axially back and forth on the piston rod 1,1' and leaves the apertures 8 unobstructed except when passing through the illustrated position at the highest speed of its pendulum movement. The damping effect of the illustrated device is relatively small. The narrow streams of liquid emitted from the jets or nozzles 10, 10' have no significant effect on the movements of the sleeve 9, 9'.

When the piston 2 oscillates in the cylinder 20 at a frequency corresponding to that of the oscillating system 11, 9 or 9', the sleeve 9, 9' remains in the position shown in the drawing and the apertures 8 are obstructed except for such inconsequential leakage as may be unavoidable for proper clearance between the sleeve 9, 9' and the piston rod 1, 1'. As the piston moves downward, as viewed in the drawing, an axial stream of rapidly moving liquid is discharged from each passage 3, 4 against the opposite radial faces of the sleeve 9, 9', and the liquid tends to displace the sleeve upwardly away from the illustrated position.

This displacement is opposed in the device illustrated in FIG. 1 by the relatively small axial component of the force exerted on the sleeve 9 by the stream of liquid discharged from the jet 10. This axial component increases rapidly with even slight axially upward displacement of the sleeve 9 and before the sleeve becomes inoperative to obstruct the apertures 8 and the liquid discharged from the jet 10 thus tends to return the sleeve 9 to the illustrated position or one sufficiently close thereto to keep the apertures 8 safely obstructed.

The stream of liquid from the jet 10' shown in FIG. 2 is directed obliquely against a peripheral portion of the top face 14, and the stream partly passes the top face 14 without impinging on the same. If the sleeve 9' is upwardly displaced from the operative position, an increasing portion of the stream from the jet 10' directly hits the top face 14, and tends to return the sleeve 9' to the illustrated position.

The vibration dampers of the invention have been found to be more reliable in their operation than the conventional dampers from which they differ mainly by the provision of the jets 10, 10' and the corresponding radially extending faces of the sleeves 9, 9'.

Various modifications of the illustrated apparatus will readily suggest themselves to those skilled in the art. In a specifically contemplated modification, the piston rod 1, 1' may be provided with a tubular, axially closed extension provided with radial apertures corresponding to the apertures 8, and the spring 11 and sleeve 9, 9' may be mounted on the extension to obstruct the apertures of the same, jets or nozzles 10, 10' being provided on the extension whose bore would be open to the upper compartment of the cylinder 20 through the illustrated apertures 8. The operation of the modified device does not materially differ from the operation of the devices shown in FIGS. 1 and 2.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A vibration damper for the rotating drum of a washing machine and like applications comprising, in combination:
   (a) a cylinder member having an axis and formed with an axially extending cavity adapted to retain a body of liquid;
   (b) piston means axially movable relative to said cylinder member and including a piston portion and a rod portion,
      (1) said piston portion dividing said cavity into first and second compartments and moving inward and outward of said compartments during the movement of said piston means,
      (2) said rod portion extending from said piston portion through said first compartment and projecting outward of said cavity through said cylinder member,
      (3) said piston portion being formed with a restricted passage therethrough between said compartments, the passage having an orifice in one of said compartments,
      (4) said piston means being further formed with an axial bore at least partly extending in said rod portion and open to the other one of said compartments, the bore communicating with said one compartment through an aperture in said piston rod portion;
   (c) a sleeve member axially slidable on said rod portion toward and away from an operative position in which the sleeve member substantially obstructs said aperture;
   (d) spring means connecting said sleeve member to said piston means for axial oscillation of said sleeve member about said position thereof;
      (1) the sleeve member having two radially extending faces facing in opposite axial directions, one of said faces being opposite said orifice of the piston portion in said position of the sleeve member; and
   (e) jet means on said piston means communicating with said bore at a position axially spaced from said aperture along said bore for directing a stream of liquid toward the other face of said sleeve member when the latter is in said position thereof, said other compartment contains liquid, and said piston member moves inward of said other compartment.

2. A damper as set forth in claim 1, wherein said jet means includes a duct integral with said rod portion and directed toward said other face.

3. A damper as set forth in claim 2, wherein said other face is obliquely inclined relative to said axis, and said duct is directed toward said other face in a direction which has at least a major radial component.

4. A damper as set forth in claim 3, wherein said other face has two axial portions respectively nearer said piston portion and more remote from said piston portion, said nearer portion being inclined relative to said axis at a greater angle than said more remote portion, and said duct being directed toward said nearer portion when said sleeve member is in said position thereof.

5. A damper as set forth in claim 4, wherein said other face is of circular cross section about said axis and concave.

6. A damper as set forth in claim 2, wherein said other face substantially extends in a radial plane, and said duct is directed toward said other face in a direction obliquely inclined relative to said axis.

References Cited by the Examiner

UNITED STATES PATENTS

| | | | |
|---|---|---|---|
| 1,816,169 | 7/1931 | Bommer | 188—96 |
| 2,244,501 | 6/1941 | Pierce | 188—88 |
| 3,114,705 | 12/1963 | Pribonic et al. | 188—88 |

MILTON BUCHLER, *Primary Examiner.*

G. E. A. HALVOSA, *Assistant Examiner.*